(12) United States Patent
Tomiyama et al.

(10) Patent No.: US 9,267,565 B2
(45) Date of Patent: Feb. 23, 2016

(54) VIBRATING MEMBER ATTACHMENT STRUCTURE

(71) Applicant: TOKAI RUBBER INDUSTRIES, LTD., Aichi-ken (JP)

(72) Inventors: Koji Tomiyama, Aichi-ken (JP); Akio Yabu, Aichi-ken (JP)

(73) Assignee: Sumitomo Riko Company Limited, Aichi (JP)

( * ) Notice: Subject to any disclaimer, the term of this patent is extended or adjusted under 35 U.S.C. 154(b) by 9 days.

(21) Appl. No.: 14/458,391

(22) Filed: Aug. 13, 2014

(65) Prior Publication Data

US 2014/0345993 A1 Nov. 27, 2014

Related U.S. Application Data

(63) Continuation of application No. PCT/JP2013/065561, filed on Jun. 5, 2013.

(30) Foreign Application Priority Data

Jun. 8, 2012 (JP) ................................ 2012-130733

(51) Int. Cl.
*F16F 7/00* (2006.01)
*F16F 15/08* (2006.01)
(52) U.S. Cl.
CPC .. *F16F 7/00* (2013.01); *F16F 15/08* (2013.01)
(58) Field of Classification Search
CPC ............. F16F 7/00; F16F 15/08; F02B 77/11; F02B 77/13; G10K 11/16; G10K 11/162; G10K 11/168
See application file for complete search history.

(56) References Cited

U.S. PATENT DOCUMENTS 5,588,810 A * 12/1996 DiFlora ............... F04B 39/0033
181/202
6,129,327 A * 10/2000 Dubois ................... F16F 15/08
248/634

(Continued)

FOREIGN PATENT DOCUMENTS

JP 47-39189 11/1972
JP 55-066236 5/1980

(Continued)

OTHER PUBLICATIONS

Search report from P.C.T., mail date is Aug. 27, 2013.

(Continued)

*Primary Examiner* — Bradley King
(74) *Attorney, Agent, or Firm* — Greenblum & Bernstein P.L.C.

(57) ABSTRACT

A vibrating member attachment structure includes: a sound insulation layer made of elastomer and including an accommodating portion that defines an accommodating space in which a vibrating member is accommodated, and a folded-back portion having a hem portion connecting to the accommodating portion, a contact portion placed so as to face the hem portion and contacting a mating member, a joint portion connecting the hem portion and the contact portion, and an insertion space defined by the hem portion, the contact portion, and the joint portion; a support member having higher rigidity than the sound insulation layer and including a sealing portion that seals an opening of the accommodating space, and an insertion portion that connects to the sealing portion and that is inserted in the insertion space; and an attachment member and including a shaft portion and a deformation suppressing portion.

9 Claims, 10 Drawing Sheets

(56) References Cited

U.S. PATENT DOCUMENTS

| | | | | |
|---|---|---|---|---|
| 6,132,183 A | * | 10/2000 | Li | F04B 39/0033 248/638 |
| 2007/0158887 A1 | * | 7/2007 | Ogata | F16F 15/02 267/136 |
| 2008/0158712 A1 | * | 7/2008 | Nakatani | B65D 81/107 360/71 |
| 2014/0326536 A1 | * | 11/2014 | Vauchel | G10K 11/168 181/290 |
| 2015/0117696 A1 | * | 4/2015 | Lee | G06F 1/1688 381/392 |
| 2015/0240906 A1 | * | 8/2015 | Wang | F16M 13/02 248/615 |

FOREIGN PATENT DOCUMENTS

| | | |
|---|---|---|
| JP | 63-006776 | 1/1988 |
| JP | 03-064583 | 10/1991 |
| JP | 2004-70128 | 3/2004 |
| JP | 2004-206811 | 7/2004 |
| JP | 2006-153108 | 6/2006 |
| JP | 2009-199653 | 9/2009 |
| JP | 2009-235979 | 10/2009 |

OTHER PUBLICATIONS

Japan Office action, dated Feb. 12, 2014 along with an English translation thereof.

International Preliminary Report on Patentability for PCT/JP2013/065561, mailed Dec. 9, 2014.

* cited by examiner

VIBRATING MEMBER ATTACHMENT STRUCTURE

CLAIM FOR PRIORITY

This application is a Continuation of PCT/JP2013/065561 filed Jun. 5, 2013, and claims the priority benefit of Japanese application 2012-130733, filed Jun. 8, 2012, the contents of which is expressly incorporated by reference herein in its entirety.

TECHNICAL FIELD

The present invention relates to vibrating member attachment structures that are used to attach a vibrating member such as an electromagnetic valve or a servomotor to a mating member.

BACKGROUND ART

Patent Document 1 discloses a damping device having a floating structure. As shown in paragraph [0039] and [FIG. 2] in Patent Document 1, the damping device elastically supports an electronic device with respect to a case body in a non-contact state. The damping device includes damper members and shock absorbing member washers. The damper members and the shock absorbing member washers are made of an elastomer (e.g., a gel-like resin).

Patent Document 2 discloses a soundproof cover for exhaust gas recirculation (EGR) valves. As shown in paragraph [0030] and [FIG. 8] of Patent Document 2, the soundproof cover includes a sound insulation layer made of a urethane elastomer and a sound absorption layer made of polyurethane foam.

RELATED ART DOCUMENTS

Patent Documents

Patent Document 1: Japanese Patent Application Publication No. 2009-199653 (JP 2009-199653 A)
Patent Document 2: Japanese Patent Application Publication No. 2004-70128 (JP 2004-70128 A)

SUMMARY OF THE INVENTION

Combining the damping device of Patent Document 1 and the soundproof cover of Patent Document 2 allows the vibrating member that generates noise to be attached to the mating member while suppressing noise and vibrations. However, this combination increases the number of parts such as the damper members and the shock absorption washers, and also complicates the structure.

In general, the damper members and the shock absorption washers are in an elastically compressed state by an attachment load that is applied when the vibrating member are attached to the mating member (specifically, a tightening load of a nut to a bolt). This may cause loss of resilience. In this case, the nut may get loose with respect to the bolt.

The vibrating member attachment structure of the present invention is completed in view of the above problems. It is an object of the present invention to provide a vibrating member attachment structure that has a simple structure and that is less likely to lose resilience.

Means for Solving the Problem (1) In order to solve the above problems, a vibrating member attachment structure according to the present invention is characterized by including: a sound insulation layer made of an elastomer and including an accommodating portion that defines an accommodating space in which a vibrating member that vibrates is accommodated, and a folded-back portion having a hem portion connecting to the accommodating portion, a contact portion placed so as to face the hem portion and contacting a mating member, a joint portion connecting the hem portion and the contact portion, and an insertion space defined by the hem portion, the contact portion, and the joint portion; a support member having higher rigidity than the sound insulation layer and including a sealing portion that seals an opening of the accommodating space, and an insertion portion that connects to the sealing portion and that is inserted in the insertion space; and an attachment member being not in contact with the insertion portion and including a shaft portion that extends through the folded-back portion with the insertion portion being inserted in the insertion space to attach the folded-back portion to the mating member, and a deformation suppressing portion that suppresses elastic deformation of the folded-back portion due to an attachment load.

The vibrating member attachment structure of the present invention includes the sound insulation layer, the support member, and the attachment member. The sound insulation layer includes the accommodating portion and the folded-back portion. The accommodating portion defines the accommodating space. The vibrating member is accommodated in the accommodating space. The folded-back portion includes the hem portion, the contact portion, and the joint portion. The hem portion, the contact portion, and the joint portion define the insertion space.

The support member includes the sealing portion and the insertion portion. The sealing portion seals the opening of the accommodating space. The sealing portion suppresses coming-off of the vibrating member from the accommodating space. The insertion portion is inserted in the insertion space of the folded-back portion. The support member is attached to the sound insulation layer by this insertion.

The attachment member includes the shaft portion and the deformation suppressing portion. The shaft portion extends through the folded-back portion. The deformation suppressing portion suppresses elastic deformation of the folded-back portion made of an elastomer due to an attachment load.

According to the vibrating member attachment structure of the present invention, the mating member, the contact portion of the folded-back portion, and the insertion portion of the support member are arranged next to each other in the axial direction of the shaft portion. That is, the contact portion made of an elastomer is interposed between the insertion portion and the mating member. This can suppress contact between the insertion portion and the mating member, and thus can suppress transmission of vibrations from the insertion portion to the mating member. According to the vibrating member attachment structure of the present invention, the attachment member does not contact the insertion portion. This can suppress transmission of vibrations from the insertion portion to the attachment member.

As described above, according to the vibrating member attachment structure of the present invention, a floating structure is ensured both in the axial direction of the shaft portion and the direction perpendicular to the axis of the shaft portion (the direction perpendicular to the axial direction). This can suppress transmission of vibrations of the vibrating member to the mating member.

According to the vibrating member attachment structure of the present invention, the attachment member includes the deformation suppressing portion. This can suppress elastic deformation of the folded-back portion due to an attachment load that is generated when the folded-back portion, namely the sound insulation layer, is attached to the mating member. The folded-back portion is therefore less likely to lose resilience. Accordingly, the attachment load is less likely to be reduced.

According to the vibrating member attachment structure of the present invention, the sound insulation layer is mounted on the support member by inserting the insertion portion of the support member into the insertion space of the folded-back portion. The vibrating member attachment structure can be attached to the mating member by attaching the folded-back portion to the mating member by the attachment member. This simplifies the attachment work.

According to the vibrating member attachment structure of the present invention, the damper members and the shock absorbing member washers as in the damping device of Patent Document 1 are not required. This reduces the number of parts and simplifies the structure. According to the vibrating member attachment structure of the present invention, the outside of the vibrating member is covered by the sound insulation layer. At least part of the noise that is generated by the vibrating member can therefore be blocked out. This can suppress leakage of the noise to the outside.

(2) Preferably, in the configuration of (1), the vibrating member attachment structure further includes: a sound absorption layer that is made of a foamed resin, that covers outside of the vibrating member, and that is accommodated in the accommodating space. According to this configuration, the outside of the vibrating member is covered by the sound absorption layer and the sound insulation layer. At least part of the noise that is generated by the vibrating member can therefore be absorbed or blocked out. This can suppress leakage of the noise to the outside.

(3) Preferably, in the configuration of (2), the sound absorption layer contains magnetic fillers. The magnetic fillers have high thermal conductivity. According to this configuration, heat of the vibrating member can therefore be dissipated to the outside through the magnetic fillers.

(3-1) Preferably, in the configuration of (3), the sound insulation layer is not bonded to the sound absorption layer, and the sound absorption layer is press-fitted in the accommodating space. Both the sound insulation layer and the sound absorption layer are flexible and therefore tend to be deformed. In this respect, according to this configuration, the sound insulation layer is in pressure contact with the sound absorption layer. Therefore, although the sound insulation layer is not bonded to the sound absorption layer, the sound insulation layer and the sound absorption layer are less likely to be separated from each other even if the sound insulation layer or the sound absorption layer is deformed. A heat transfer path between the vibrating member and the outside is therefore less likely to be disconnected.

(3-2) Preferably, in the configuration of (3), the magnetic fillers are oriented in a thickness direction of the sound absorption layer. According to this configuration, thermal conductivity in the thickness direction of the sound absorption layer is increased.

(4) Preferably, in the configuration of any one of (1) to (3), the contact portion has at least one of a line contact portion that line-contacts the mating member, and a point contact portion that point-contacts the mating member. According to this configuration, the contact area of the folded-back portion, namely the sound insulation layer, with the mating member, is reduced. This can suppress transmission of vibrations from the sound insulation layer to the mating member.

(5) Preferably, in the configuration of any one of (1) to (4), the hem portion has a smaller thickness than the contact portion. In the case where the vibrating member vibrates in such a direction that the vibrating member is separated from the mating member, a load in a bending direction is applied to the hem portion connecting to the accommodating portion. In order to follow the vibrations of the vibrating member, it is more desirable that the hem portion have lower rigidity. In this respect, according to this configuration, since the hem portion has a small thickness, the hem portion has low flexural rigidity. Accordingly, the hem portion tends to follow the vibrations of the vibrating member.

On the contrary, in the case where the vibrating member vibrates in such a direction that the vibrating member gets closer to the mating member, a load in a compressing direction is applied to the contact portion between the mating member and the insertion portion. In order to follow the vibrations of the vibrating member, it is more desirable that the contact portion have lower compression stiffness. In this respect, according to this configuration, since the contact portion has a large thickness, the contact portion has low compression stiffness. Accordingly, the contact portion tends to follow the vibrations of the accommodating portion.

(6) Preferably, in the configuration of any one of (1) to (5), the accommodating portion has a window portion that allows the accommodating space to communicate with outside, and the vibrating member has a protruding portion that protrudes to the outside from the accommodating space through the window portion.

The sound insulation layer made of an elastomer is flexible. According to this configuration, the vibrating member can therefore be accommodated in the accommodating space with the protruding portion being mounted on the vibrating member. Accordingly, it is not necessary to remove the protruding portion from the vibrating member before accommodating the vibrating member in the accommodating space and to attach the protruding portion to the vibrating member after accommodating the vibrating member in the accommodating space. This simplifies the attachment work of the vibrating member.

(7) Preferably, in the configuration of (6), the window portion extends to the hem portion. According to this configuration, the sound insulation layer is more easily deformed. This further simplifies the attachment work of the vibrating member.

(8) Preferably, in the configuration of any one of (1) to (7), the sound insulation layer has on its outer surface a buffer portion that reduces shock that is caused when the sound insulation layer contacts an adjoining member. According to this configuration, shock that is caused when the sound insulation layer contacts the adjoining member can be reduced by using flexibility of the sound insulation layer made of an elastomer. Accordingly, even if the installation space for the vibrating member attachment structure is narrow and small, the vibrating member affects the adjoining member to a small degree.

(9) Preferably, in the configuration of any one of (1) to (8), at least one of the sound insulation layer and the support member has a shift suppressing portion that suppresses relative shifting of the other. According to this configuration, the shift suppressing portion can suppress relative shifting between the sound insulation layer and the support member.

Effects of the Invention

According to the present invention, a vibrating member attachment structure can be provided which has a small number of parts, has a simple structure, and is less likely to lose resilience.

DESCRIPTION OF THE REFERENCE NUMERALS

1: Vibrating Member Attachment Structure

2: Sound Insulation Layer, 20: Accommodating Portion, 200: Accommodating Space, 201: Window Portion, 21: Folded-Back Portion, 210: Hem Portion, 210a: Through Hole, 211: Contact Portion, 211a: Through Hole, 211b: Line Contact Portion, 211c: Point Contact Portion, 212: Joint Portion, 213: Insertion Space, 214: Through Groove, 22: Buffer Rib (Buffer Portion), 23: Shift Suppressing Wall (Shift Suppressing Portion)

3: Support Member, 30: Sealing Portion, 300: Protrusion, 31: Insertion Portion, 310: Through Hole, 311: Through Groove, 32: Shift Suppressing Wall (Shift Suppressing Portion), 320: Rib

4: Attachment Member, 40: Bolt (Shaft Portion), 400: Body (Deformation Suppressing Portion), 401: Distal End, 41: Collar (Deformation Suppressing Portion), 42: Washer, 43: Nut

5: Sound absorption Layer, 50: Box Portion, 500: Wall Portion, 500a: Window Portion, 501: Hinge Portion, 51: Lid Portion, 510: Notch

6: Bracket (Mating Member), 60: Attachment Hole

9: Electromagnetic Valve, 90: Port (Protruding Portion), 91: Connector (Protruding Portion), 92: Cord (Protruding Portion), 93: Connector (Protruding Portion)

T1: Thickness, T2: Thickness

MODES FOR CARRYING OUT THE INVENTION

Embodiments of a vibrating member attachment structure according to the present invention will be described below.

First Embodiment

Configuration of Vibrating Member Attachment Structure

Figure 1:
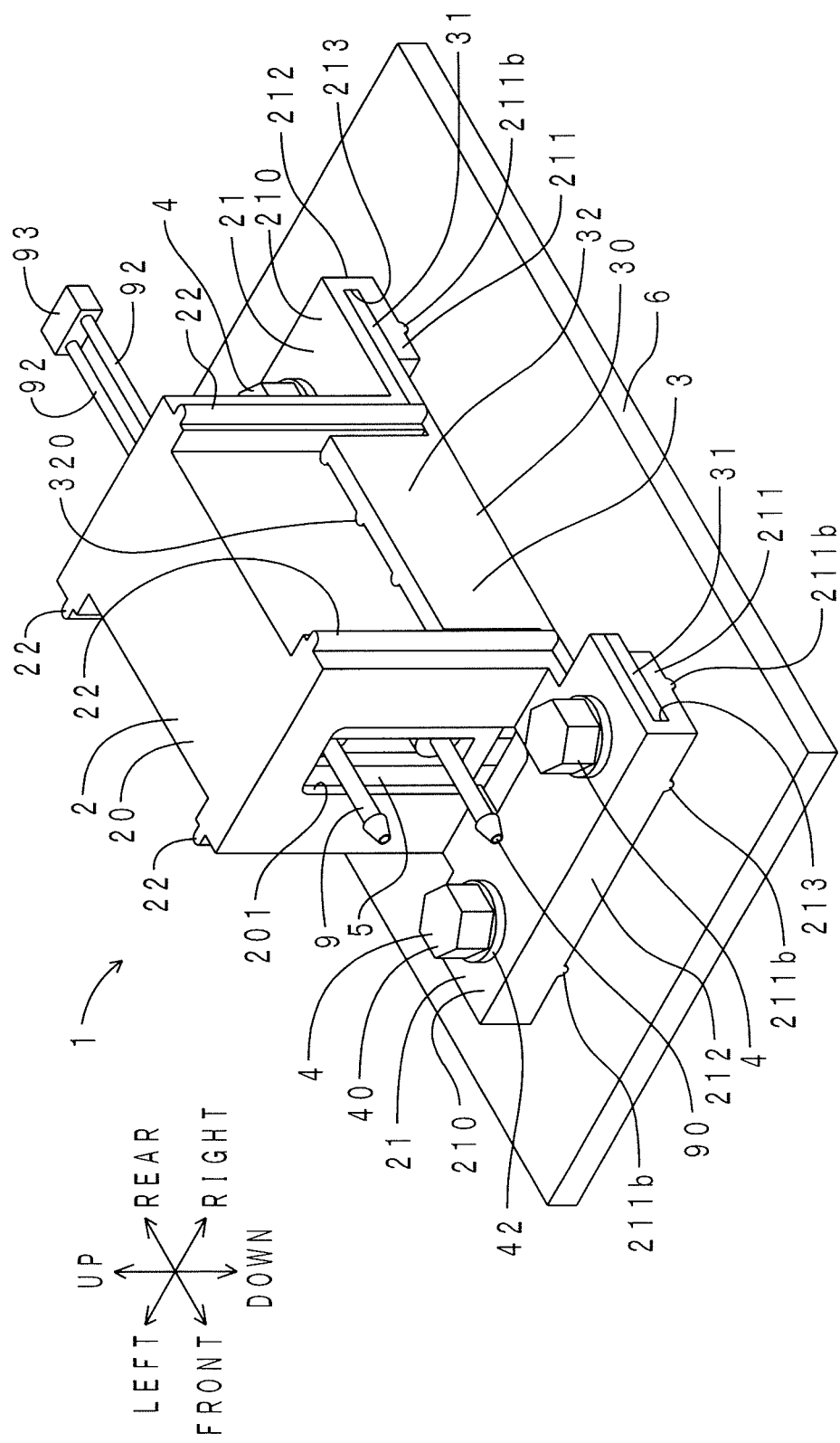
FIG. 1 is a perspective view of a vibrating member attachment structure of a first embodiment.
Figure 2:
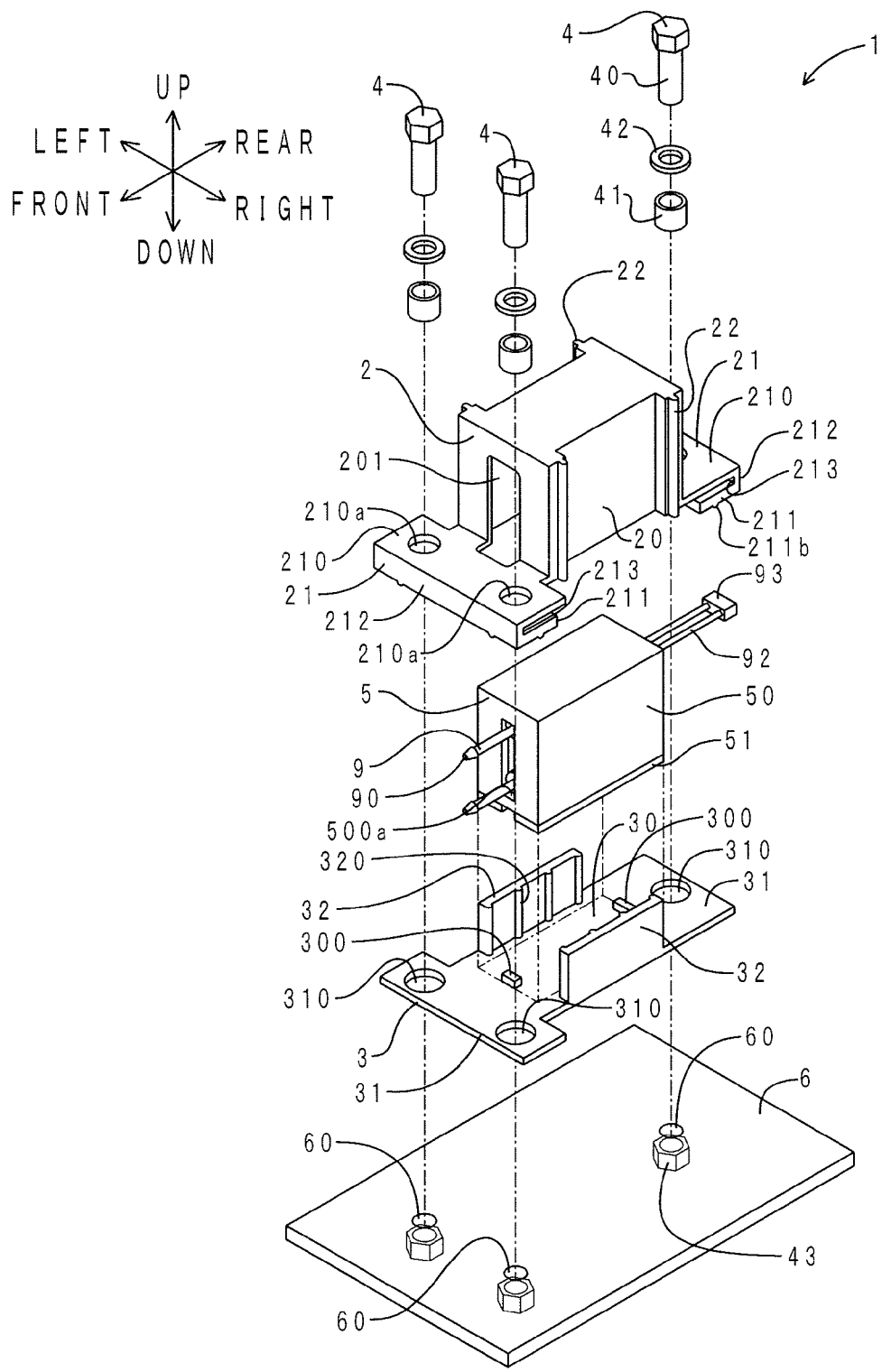
FIG. 2 is an exploded perspective view of the vibrating member attachment structure.
Figure 3:
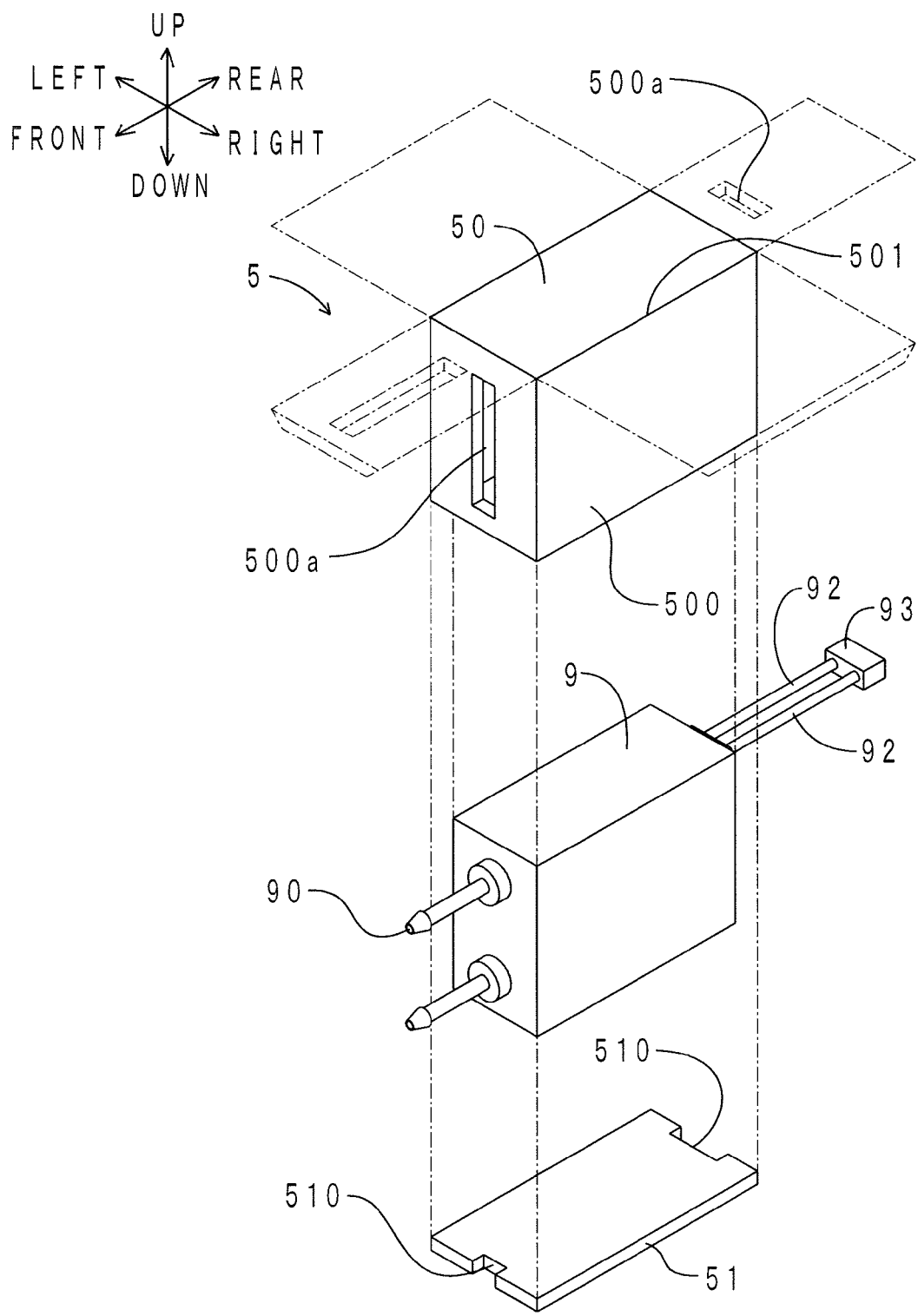
FIG. 3 is an exploded perspective view of a portion near a sound absorption layer of the vibrating member attachment structure.
Figure 4:
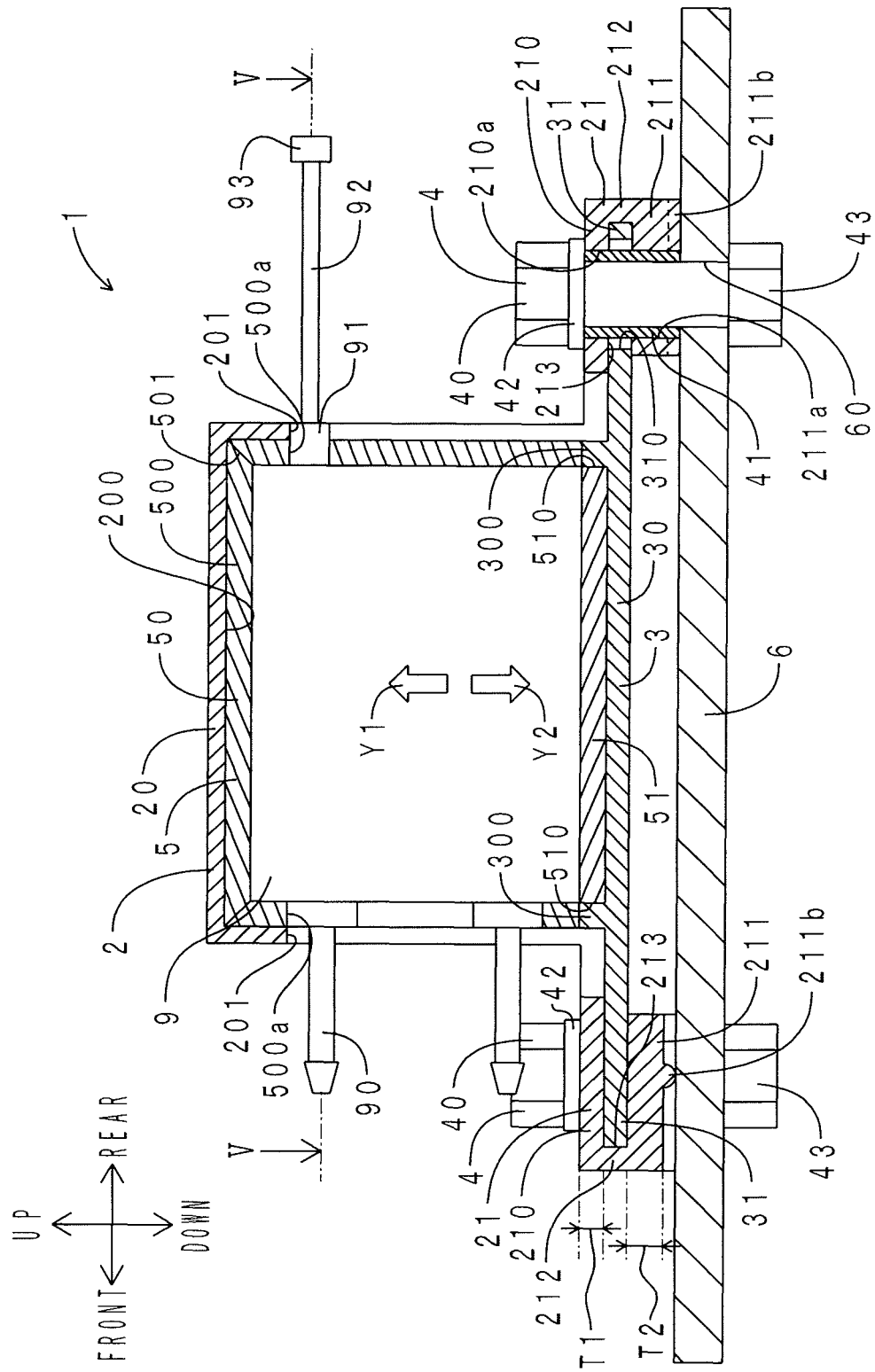
FIG. 4 is a sectional view along the direction IV-IV in FIG. 5.
Figure 5:
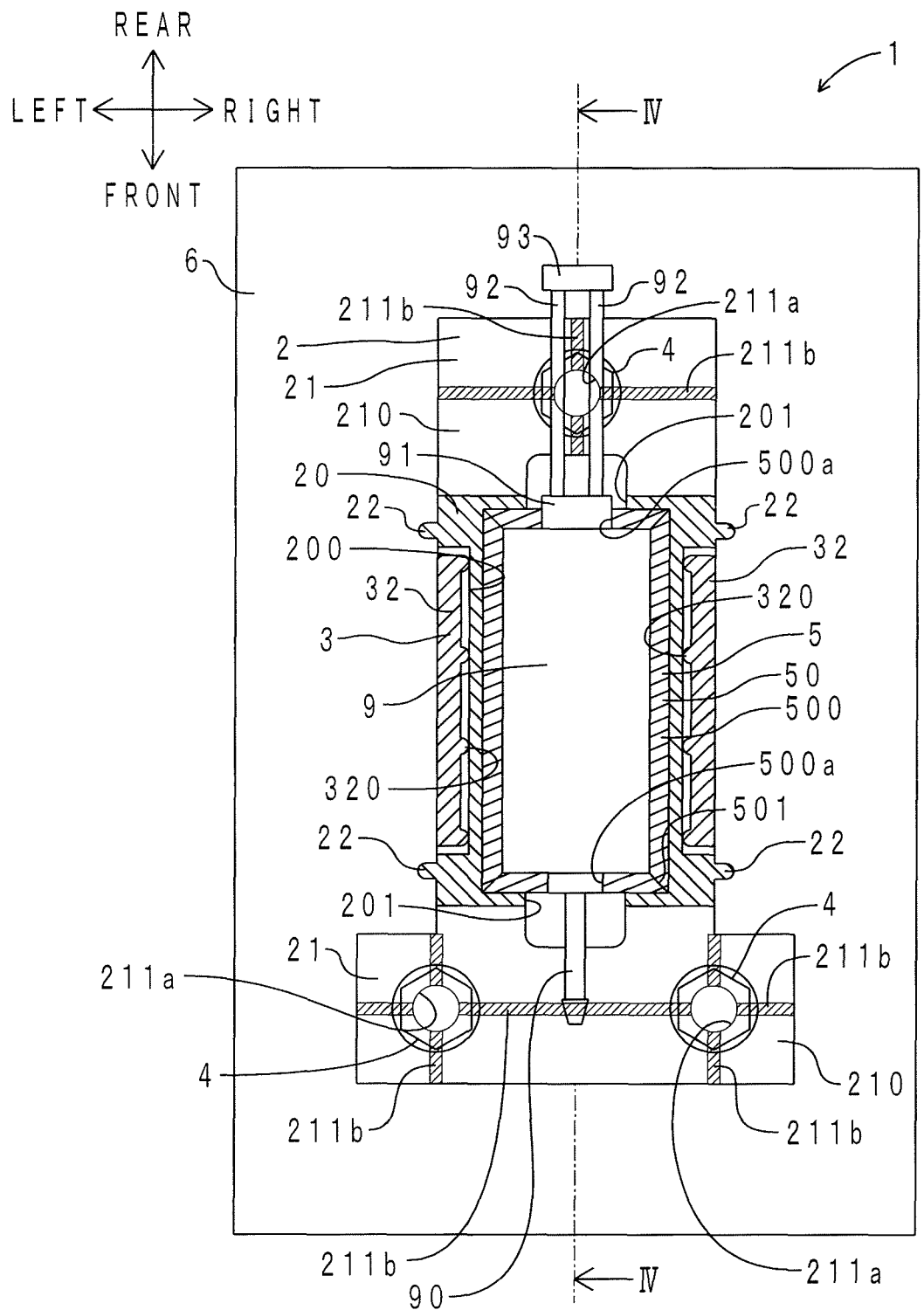
FIG. 5 is a sectional view along the direction V-V in FIG. 4.

First, the configuration of a vibrating member attachment structure of the present embodiment will be described. FIG. 1 is a perspective view of the vibrating member attachment structure of the present embodiment. FIG. 2 is an exploded perspective view of the vibrating member attachment structure. FIG. 3 is an exploded perspective view of a portion near a sound absorption layer of the vibrating member attachment structure. FIG. 4 is a sectional view along the direction IV-VI in FIG. 5 (a longitudinal sectional view as viewed from the right). FIG. 5 is a sectional view taken along the direction V-V in FIG. 4 (a longitudinal sectional view as viewed from above).

As shown in FIGS. 1 to 5, a vibrating member attachment structure 1 of the present embodiment is used to attach an electromagnetic valve 9 to a bracket 6. The electromagnetic valve 9 is included in the concept of the "vibrating member" of the present invention. The bracket 6 is included in the concept of the "mating member" of the present invention. The vibrating member attachment structure 1 includes a sound insulation layer 2, a support member 3, three attachment members 4, and a sound absorption layer 5.

{Sound Insulation Layer 2}

The sound insulation layer 2 is made of TPV (dynamically cross-linked mixture of ethylene propylene diene rubber (EPDM) and polypropylene (PP)). The TPV is included in the concept of the "elastomer" of the present invention.

The sound insulation layer 2 includes an accommodating portion 20, two folded-back portions 21, and four buffer ribs 22. The buffer ribs 22 are included in the concept of the "buffer portion" of the present invention.

The accommodating portion 20 is formed in the shape of a rectangular parallelepiped box that opens downward (in the direction toward the bracket 6). The accommodating portion 20 includes an accommodating space 200 and two window portions 201. The accommodating space 200 is defined inside the accommodating portion 20. The two window portions 201 are formed in the front and rear walls of the accommodating portion 20. Each of the two window portions 201 is formed in the shape of a long hole extending in the vertical direction. Each of the two window portions 201 allows the accommodating space 200 to communicate with the outside. Each of the two window portions 201 extends to a hem portion 210 described below.

The two folded-back portions 21 extend toward the front and rear from the opening edge of the lower opening of the accommodating portion 20. The front folded-back portion 21 is generally formed in a U-shape that opens rearward. The front folded-back portion 21 includes the hem portion 210, a contact portion 211, a joint portion 212, and an insertion space 213. The hem portion 210 is formed in the shape of a rectangular plate. The hem portion 210 extends forward from the opening edge of the accommodating portion 20. The hem portion 210 has two through holes 210a. The two through holes 210a are located in the right and left parts of the hem portion 210. Each of the two through holes 210a extends through the hem portion 210 in the vertical direction.

The contact portion 211 is formed in the shape of a rectangular plate. The contact portion 211 is placed below the hem portion 210 at a predetermined interval therebetween. The contact portion 211 has two through holes 211a and a line contact portion 211b. The two through holes 211a are located in the right and left parts of the contact portion 211. Each of the two through holes 211a extends through the contact portion 211 in the vertical direction. The through holes 211a of the contact portion 211 are aligned with the through holes 211a of the hem portion 210 in the vertical direction. As shown transparently in FIG. 5, the line contact portion 211b (hatched portion) is placed on the lower surface of the contact portion 211. The line contact portion 211b is formed in the shape of a rib. The line contact portion 211b extends in the lateral direction (the lateral direction of the vibrating member attachment structure 1) and the longitudinal direction (the longitudinal direction of the vibrating member attachment structure 1) on the lower surface of the contact portion 211. As shown in FIG. 4, the line contact portion 211b has a semicircular section along the lateral direction (vertical direction). The line contact portion 211b is therefore in line contact with the upper surface of the bracket 6 described below at one point on the circumference. The thickness T1 in the vertical direction (the direction in which the hem portion 210, an insertion portion 31 described below, and the contact portion 211 are stacked) of the hem portion 210 is smaller than the thickness T2 in the vertical direction of the contact portion (excluding the line contact portion 211b) 211.

The joint portion 212 is formed in the shape of a rectangular plate. The joint portion 212 connects the front end of the hem portion 210 and the front end of the contact portion 211 in the vertical direction. The insertion space 213 is defined by the lower surface of the hem portion 210, the upper surface of the contact portion 211, and the rear surface of the joint portion 212. That is, the insertion space 213 opens rearward.

The configuration of the rear folded-back portion 21 is similar to that of the front folded-back portion 21. As shown in FIG. 5, however, the hem portion 210 of the rear folded-back portion 21 has a single through hole 210a, and the contact portion 211 of the rear folded-back portion 21 has a single through hole 211a. The rear folded-back portion 21 and the front folded-back portion 21 are placed symmetrically. That is, the insertion space 213 of the rear folded-back portion 21 opens forward.

As shown in FIG. 5, the four buffer ribs 22 are arranged along the front and rear edges of the left surface and the front and rear edges of the right surface of the accommodating portion 20. As shown in FIG. 1, each of the four buffer ribs 22 extends in the vertical direction. The buffer ribs 22 have a semicircular section along the lateral direction (longitudinal direction). The four buffer ribs 22 are capable of elastically contacting adjoining members (not shown) that are placed on the right and left sides of the vibrating member attachment structure 1.

{Sound Absorption Layer 5, Electromagnetic Valve 9}

As shown in FIG. 4, the sound absorption layer 5 includes a box portion 50 and a lid portion 51. The sound absorption layer 5 is accommodated in the accommodating space 200 in a compressed state in the longitudinal and lateral directions. The sound absorption layer 5 has lower rigidity than the sound insulation layer 2 in the longitudinal, lateral, and vertical directions.

The box portion 50 is made of polyurethane foam containing magnetic fillers, and is formed in the shape of a box that opens downward. The polyurethane foam containing magnetic fillers is included in the concept of the "foamed resin" of the present invention. The box portion 50 includes five wall portions 500 and four hinge portions 501. Each of the four hinge portions 501 is placed on the boundary between the wall portions 500 that are adjacent to each other. As shown by chain lines in FIG. 3, the box portion 50 can be developed into a flat plate. Each of the front and rear wall portions 500 of the five wall portions 500 has a window portion 500a. The window portion 500a of the front wall portion 500 is formed in the shape of a long hole extending in the vertical direction. The window portion 500a of the rear wall 500 is formed in the upper part of the wall portion 500.

The lid portion 51 is made of polyurethane foam containing magnetic fillers, and is formed in the shape of a rectangular plate. The lid portion 51 seals the lower opening of the box portion 50. The lid portion 51 includes two notches 510. The two notches 510 are formed in the front and rear edges of the lid portion 51. The two notches 510 have different widths from each other in the lateral direction.

The electromagnetic valve 9 is accommodated in the sound absorption layer 5. The electromagnetic valve 9 includes two ports 90, two connectors 91, 93, and two cords 92. Each of the two ports 90, the two connectors 91, 93, and the two cords 92 is included in the concept of the "protruding portion" of the present invention.

The two ports 90 are placed in the front surface of the electromagnetic valve 9. The two ports 90 are arranged next to each other in the vertical direction. As shown in FIG. 4, the two ports 90 protrude to the outside via the front window portion 500a of the sound absorption layer 5 and the front window portion 201 of the sound insulation layer 2. The connector 91 is connected to the rear surface of the electromagnetic valve 9. The connector 91 is accommodated in the rear window portion 500a of the sound absorption layer 5 and the rear window portion 201 of the sound insulation layer 2. The front ends of the two cords 92 are connected to the connector 91. The rear ends of the two cords 92 are connected to the connector 93.

{Support Member 3}

The support member 3 is made of PP. The support member 3 has higher rigidity than the sound insulation layer 2 and the sound absorption layer 5 in the longitudinal, lateral, and vertical directions. The support member 3 includes a sealing portion 30, two insertion portions 31, and two shift suppressing walls 32. The shift suppressing wall 32 are included in the concept of the "shift suppressing portion" of the present invention.

The sealing portion 30 is formed in the shape of a rectangular plate. The sealing portion 30 seals the opening of the accommodating space 200 of the sound insulation layer 2 from below. That is, the sealing portion 30 supports from below the sound absorption layer 5 containing the electromagnetic valve 9. The sealing portion 30 includes two protrusions 300. The two protrusions 300 protrude from the upper surface of the sealing portion 30. The two protrusions 300 are placed on the front and rear ends of the sealing portion 30. The two protrusions 300 have different widths from each other in the lateral direction. As shown in FIG. 4, the two protrusions 300 are accommodated in the two notches 510 of the lid portion 51.

Each of the two insertion portions 31 is formed in the shape of a rectangular plate. The two insertion portions 31 extend forward and rearward from the sealing portion 30. As shown in FIG. 4, the front insert portion 31 is inserted in the insertion space 213 of the front folded-back portion 21. The front edge of the front insertion portion 31 is in contact with the rear surface (inner surface) of the joint portion 212. The front folded-back portion 21, namely the sound insulation layer 2, is therefore not allowed to move rearward with respect to the front insertion portion 31, namely the support member 3.

The front insertion portion 31 has two through holes 310. The two through holes 310 are located in the right and left parts of the insertion portion 31. Each of the two through holes 310 extends through the insertion portion 31 in the vertical direction.

The through holes 211a of the contact portion 211, the through holes 310 of the insertion portion 31, and the through holes 210a of the hem portion 210 are aligned with each other in the vertical direction. The through holes 211a of the contact portion 211 have the same diameter as the through holes 210a of the hem portion 210. On the other hand, the through holes 310 of the insertion portion 31 have a larger diameter than the through holes 211a and the through holes 210a.

The configuration of the rear insertion portion 31 is similar to that of the front insertion portion 31. As shown in FIG. 5, however, the rear insertion portion 31 has a single through hole 310. As shown in FIG. 4, the rear insertion portion 31 is inserted in the insertion space 213 of the rear folded-back portion 21. The rear edge of the rear insertion portion 31 is in contact with the front surface (inner surface) of the joint portion 212. The rear folded-back portion 21, namely the sound insulation layer 2, is therefore not allowed to move forward with respect to the rear insertion portion 31, namely the support member 3. The front and rear insertion portions 31 of the support member 3 are inserted in the insertion spaces 213 of the front and rear folded-back portions 21 of the sound insulation layer 2, which restricts longitudinal movement of the sound insulation layer 2 with respect to the support member 3.

As shown in FIG. 2, the two shift suppressing walls 32 stand upward from the right and left edges of the upper surface of the sealing portion 30. Four ribs 320 protrude from the right surface (inner surface) of the left shift suppressing wall 32. Each of the four ribs 320 extends in the vertical direction. As shown in FIG. 5, each of the four ribs 320 is in line contact with the left surface of the accommodating portion 20 of the sound insulation layer 2. Similarly, four ribs 320 protrude from the left surface (inner surface) of the right shift suppressing wall 32. Each of the ribs 320 extends in the vertical direction. As shown in FIG. 5, each of the four ribs 320 is in line contact with the right surface of the accommodating portion 20 of the sound insulation layer 2. The pair of right and left shift suppressing walls 32 thus contact the right and left outer surfaces of the accommodating portion 20, which restricts lateral movement of the sound insulation layer 2 with respect to the support member 3.

{Attachment Member 4, Bracket 6}

As shown in FIGS. 1 and 2, the bracket 6 is made of a metal and is formed in the shape of a rectangular plate. The bracket 6 has three attachment holes 60. Each of the three attachment holes 60 extends through the bracket 6 in the vertical direction. As shown in FIG. 4, the through holes 211a of the contact portions 211, the through holes 310 of the insertion portions 31, and the through holes 210a of the hem portions 210 are aligned in this order from bottom up above the three attachment holes 60.

The three attachment members 4 are placed so as to correspond to the three attachment holes 60. Each of the three attachment members 4 includes a bolt 40, a collar 41, a washer 42, and a nut 43. The bolt 40 is included in the concept of the "shaft portion" of the present invention. The collar 41 is included in the concept of the "deformation suppressing portion" of the present invention.

As shown transparently in FIG. 2, the nut 43 is welded to the lower surface of the bracket 6. The nut 43 is made of a metal and is placed under the attachment hole 60. As shown in FIG. 4, the collar 41 is made of a metal and is formed in a cylindrical shape extending in the vertical direction. The collar 41 is placed in the folded-back portion 21. Specifically, the collar 41 is placed radially inside the through hole 211a of the contact portion 211, the through hole 310 of the insertion portion 31, and the through hole 210a of the hem portion 210.

The outer peripheral surface of the collar 41 is in contact with the inner peripheral surface of the through hole 211a of the contact portion 211 and the inner peripheral surface of the through hole 210a of the hem portion 210. On the other hand, clearance is defined between the outer peripheral surface of the collar 41 and the inner peripheral surface of the through hole 310 of the insertion portion 31. Namely, the collar 41 having high rigidity does not contact the insertion portion 31, i.e., the rigid support member 3, having high rigidity. The upper end face of the collar 41 is approximately flush with the upper surface of the hem portion 210. The lower end face of the collar 41 is approximately flush with the lower surface of the contact portion (including the line contact portion 211b). That is, the vertical length (axial length) of the collar 41 is approximately the same as that of the folded-back portion 21.

The washer 42 is made of a metal and is formed in the shape of a ring. The washer 42 is placed around the through hole 210a of the hem portion 210. The washer 42 is in contact with the upper end face of the collar 41.

The bolt 40 is made of a metal and extends in the vertical direction. The bolt 40 extends through the washer 42, the collar 41, and the attachment hole 60 of the bracket 6 in this order from top down. The lower end of the bolt 40 protrudes downward from the lower surface of the bracket 6. The nut 43 is tightened to the lower end of the bolt 40. The collar 41 is made of a metal and has high rigidity. The collar 41 is therefore less likely to be compressed even if the bolt 40 is additionally tightened. Accordingly, the folded-back portion 21 made of an elastomer and having low rigidity is also less likely to be compressed. The collar 41 thus suppresses deformation of the folded-back portion 21 that is caused by a tightening load (corresponding to the "attachment load" of the present invention) of the nut 43 to the bolt 40. The vibrating member attachment structure 1 is thus attached to the bracket 6 by the three attachment members 4.

Assembling Method of Vibrating Member Attachment Structure

An assembling method of the vibrating member attachment structure 1 of the present embodiment will be described below. First, as shown in FIG. 3, the electromagnetic valve 9 is accommodated in the box portion 50 with the box portion 50 of the sound absorption layer 5 being folded. The connector 91, the two cords 92, and the connector 93 have already been mounted on the electromagnetic valve 9. When the electromagnetic valve 9 is accommodated, the two ports 90 are made to protrude forward from the front window portion 500a. In addition, the connector 91, the two cords 92, and the connector 93 are pulled out of the rear window portion 500a rearward.

Then, as shown in FIG. 2, the box portion 50 accommodating the electromagnetic valve 9 is accommodated in the accommodating space 200 of the sound insulation layer 2 through its lower opening. At this time, as shown in FIG. 4, the flexible sound insulation layer 2 is elastically deformed to cause the two ports 90 to protrude forward from the front window portion 201, and to pull the connector 91, the two cords 92, and the connector 93 out of the rear window portion 201 rearward.

Thereafter, the support member 3 having the lid portion 51 mounted thereon in advance is attached to the sound insulation layer 2 accommodating the box portion 50 (i.e., the electromagnetic valve 9). Specifically, the flexible sound insulation layer 2 is elastically deformed to insert the front insertion portion 31 in the front insertion space 213 and to insert the rear insertion portion 31 in the rear insertion space 213. The opening of the box portion 50 is sealed by the lid portion 51. That is, the sound absorption layer 5 is completed.

The collar 41 is inserted radially inside the through hole 211a of the contact portion 211, the through hole 310 of the insertion portion 31, and the through hole 210a of the hem portion 210. Next, the washer 42 is placed above the collar 41. The bolt 40 is inserted in the washer 42, the collar 41, and the attachment hole 60 of the bracket 6 in this order from top down. Lastly, the bolt 40 is rotated about its axis to tighten the nut 43 to the lower end of the bolt 40. The vibrating member attachment structure 1 of the present embodiment is assembled in this manner. The vibrating member attachment structure 1 is mounted on the bracket 6.

Functions and Effects

Functions and effects of the vibrating member attachment structure 1 of the present embodiment will be described below. According to the vibrating member attachment structure 1 of the present embodiment, as shown in FIG. 4, the contact portion 211 made of an elastomer and having low rigidity is interposed between the insertion portion 31 and the bracket 6. This can suppress contact between the insertion portion 31 having high rigidity and the bracket 6 having high rigidity, and therefore can suppress transmission of vibrations from the insertion portion 31 to the bracket 6.

According to the vibrating member attachment structure 1 of the present embodiment, as shown in FIG. 4, the hem portion 210 made of an elastomer and having low rigidity is interposed between the insertion portion 31 and the washer 42. This can suppress contact between the insertion portion 31 having high rigidity and the washer 42 having high rigidity, and therefore can suppress transmission of vibrations from the insertion portion 31 to the bracket 6 through the washer 42 and the bolt 40.

According to the vibrating member attachment structure 1 of the present embodiment, as shown in FIG. 4, the non-contact portion is interposed between the collar 41 and the through hole 310. This can suppress transmission of vibrations from the insertion portion 31 to the bracket 6 through the collar 41 and the bolt 40.

According to the vibrating member attachment structure 1 of the present embodiment, a floating structure is ensured both in the vertical direction (the axial direction of the bolt 40) and the horizontal direction (the direction perpendicular to the axial direction). This can suppress transmission of vibrations of the electromagnetic valve 9 to the bracket 6.

According to the vibrating member attachment structure 1 of the present embodiment, as shown in FIG. 4, the attachment member 4 includes the collar 41. The upper end face of the collar 41 is approximately flush with the upper surface of the hem portion 210. The lower end face of the collar 41 is approximately flush with the lower surface of the contact portion (including the line contact portion 211b). That is, the vertical length (axial length) of the collar 41 is approximately the same as that of the folded-back portion 21. This can suppress compression of the folded-back portion 21 by an attachment load that is generated when the folded-back portion 21, namely the sound insulation layer 2, is attached to the bracket 6 (i.e., a tightening load of the nut 43 to the bolt 40). The folded-back portion 21 is therefore less likely to lose resilience. Accordingly, the attachment load is less likely to be reduced.

According to the vibrating member attachment structure 1 of the present embodiment, as shown in FIG. 4, the sound insulation layer 2 can be mounted on the support member 3 by inserting the insertion portion 31 of the support member 3 in the insertion space 213 of the folded-back portion 21. The vibrating member attachment structure 1 can be attached to the bracket 6 by attaching the folded-back portion 21 to the bracket 6 by the attachment member 4. This simplifies the attachment work.

According to the vibrating member attachment structure 1 of the present embodiment, the damper members and impact absorption member washers as in the damping device of Patent Document 1 are not required. This reduces the number of parts and simplifies the structure. According to the vibrating member attachment structure 1 of the present embodiment, as shown in FIG. 4, the outside of the electromagnetic valve 9 is covered by the sound insulation layer 2. At least part of the noise that is generated by the electromagnetic valve 9 can therefore be blocked out. This can suppress leakage of the noise to the outside.

According to the vibrating member attachment structure 1 of the present embodiment, as shown in FIG. 4, the outside of the electromagnetic valve 9 is covered not only by the sound insulation layer 2 but also by the sound absorption layer 5. At least part of the noise that is generated by the electromagnetic valve 9 can therefore be absorbed or blocked out. This can suppress leakage of the noise to the outside.

According to the vibrating member attachment structure 1 of the present embodiment, the sound absorption layer 5 contains magnetic fillers. The magnetic fillers have high thermal conductivity. Heat of the electromagnetic valve 9 can therefore be dissipated to the outside through the magnetic fillers.

According to the vibrating member attachment structure 1 of the present embodiment, as shown in FIG. 4, the sound absorption layer 5 is press-fitted in the accommodating space 200 of the sound insulation layer 2. Accordingly, although the sound insulation layer 2 is not bonded to the sound absorption layer 5, the sound insulation layer 2 and the sound absorption layer 5 are less likely to be separated from each other even if the sound insulation layer 2 or the sound absorption layer 5 is deformed. A heat transfer path between the electromagnetic valve 9 and the outside is therefore less likely to be disconnected.

According to the vibrating member attachment structure 1 of the present embodiment, the magnetic fillers are oriented in the thickness direction of the sound absorption layer 5. That is, many heat transfer paths extending in the thickness direction are formed in the sound absorption layer 5. The heat transfer path is formed by a plurality of magnetic fillers connected in the shape of a chain (including the shape of a dotted line). Heat of the electromagnetic valve 9 can therefore be quickly dissipated to the outside through the sound absorption layer 5. The vibrating member attachment structure 1 of the present embodiment thus has high heat dissipation capability.

According to the vibrating member attachment structure 1 of the present embodiment, as shown in FIGS. 4 and 5, the contact portion 211 includes the line contact portion 211b. The line contact portion 211b is in line contact with the upper surface of the bracket 6. According to the vibrating member attachment structure 1 of the present embodiment, the contact area of the folded-back portion 21, namely the sound insulation layer 2, with the bracket 6, is reduced. This can suppress transmission of vibrations from the sound insulation layer 2 to the bracket 6, and can suppress transfer of heat from the sound insulation layer 2 to the bracket 6.

According to the vibrating member attachment structure 1 of the present embodiment, as shown in FIG. 4, the thickness T1 in the vertical direction (the direction in which the hem portion 210, the insertion portion 31, and the contact portion 211 are stacked) of the hem portion 210 is smaller than the thickness T2 in the vertical direction of the contact portion (excluding the line contact portion 211b) 211. The hem portion 210 therefore has low flexural rigidity in the vertical direction. Accordingly, even if the electromagnetic valve 9 is displaced upward with respect to the sound insulation layer 2 as shown by arrow Y1, the hem portion 210 can be curved according to the displacement. Moreover, the contact portion 211 has low rigidity against expansion and contraction in the vertical direction. Accordingly, even if the electromagnetic valve 9 is displaced downward with respect to the sound insulation layer 2 as shown by arrow Y2, the contact portion 211 can contract according to the displacement.

According to the vibrating member attachment structure 1 of the present embodiment, the sound insulation layer 2 is made of a flexible elastomer. As shown in FIG. 4, the electromagnetic valve 9 can therefore be accommodated in the accommodating space 200 with the two ports 90, the connector 91, the two cords 92, and the connector 93 being mounted on the electromagnetic valve 9. Accordingly, it is not necessary to remove the connector 91, the two cords 92, and the connector 93 from the electromagnetic valve 9 before the electromagnetic valve 9 is accommodated in the accommodating space 200 and to attach the connector 91, the two cords 92, and the connector 93 to the electromagnetic valve 9 after accommodating the electromagnetic valve 9 in the accommodating space 200. This simplifies the attachment work of the electromagnetic valve 9.

According to the vibrating member attachment structure 1 of the present embodiment, as shown in FIG. 4, each window portion 201 of the sound insulation layer 2 extends from the accommodating portion 20 to the hem portion 210. This makes it easier for the sound insulation layer 2 to be deformed. This further simplifies the attachment work of the electromagnetic valve 9.

According to the vibrating, member attachment structure 1 of the present embodiment, as shown in FIG. 5, the sound insulation layer 2 includes the buffer ribs 22 on its outer surfaces. This can reduce shock that is caused when the sound insulation layer 2 contacts an adjoining member. Accordingly, even if the installation space for the vibrating member attachment structure 1 is narrow and small, vibrations of the electromagnetic valve 9 affect the adjoining member to a small degree.

According to the vibrating member attachment structure 1 of the present embodiment, as shown in FIG. 2, the support member 3 includes the shift suppressing walls 32. This can suppress relative shifting between the sound insulation layer 2 and the support member 3 in the lateral direction.

According to the vibrating member attachment structure 1 of the present embodiment, as shown in FIG. 3, the two notches 510 of the lid portion 51 have different shapes from each other. Similarly, as shown in FIG. 2, the two protrusions 300 of the sealing portion 30 have different shapes from each other. It is therefore less likely to attach the lid portion 51 to the sealing portion 30 in a wrong attachment direction. According to the vibrating member attachment structure 1 of the present embodiment, as shown in FIG. 3, the box portion 50 can be developed. This makes it easier to accommodate the electromagnetic valve 9 in the box portion 50.

According to the vibrating member attachment structure 1 of the present embodiment, as shown in FIGS. 1 and 2, the attachment members 4 are placed on the right and left sides of the two ports 90. This simplifies the insertion work of the bolts 40 into the through holes 210a and thus the attachment work of the vibrating member attachment structure 1 to the bracket 6 as compared with the case where the attachment members 4 are placed under the two ports 90.

According to the vibrating member attachment structure 1 of the present embodiment, each of the pair of right and left shift suppressing walls 32 has the four ribs 320 on its inner surface. The four ribs 320 are in line contact with the outer surface of the accommodating portion 20. This makes it easier to insert the accommodating portion 20 of the sound insulation layer 2 inside the pair of right and left shift suppressing walls 32.

Second Embodiment

A vibrating, member attachment structure of the present embodiment is different from the vibrating member attachment structure of the first embodiment in that the folded-back portions of the sound insulation layer have through grooves, the sound insulation layer has two shift suppressing walls, the insertion portions of the support member have through grooves, and the contact portions have no line contact portion. Only the differences will be described below.

Figure 6:
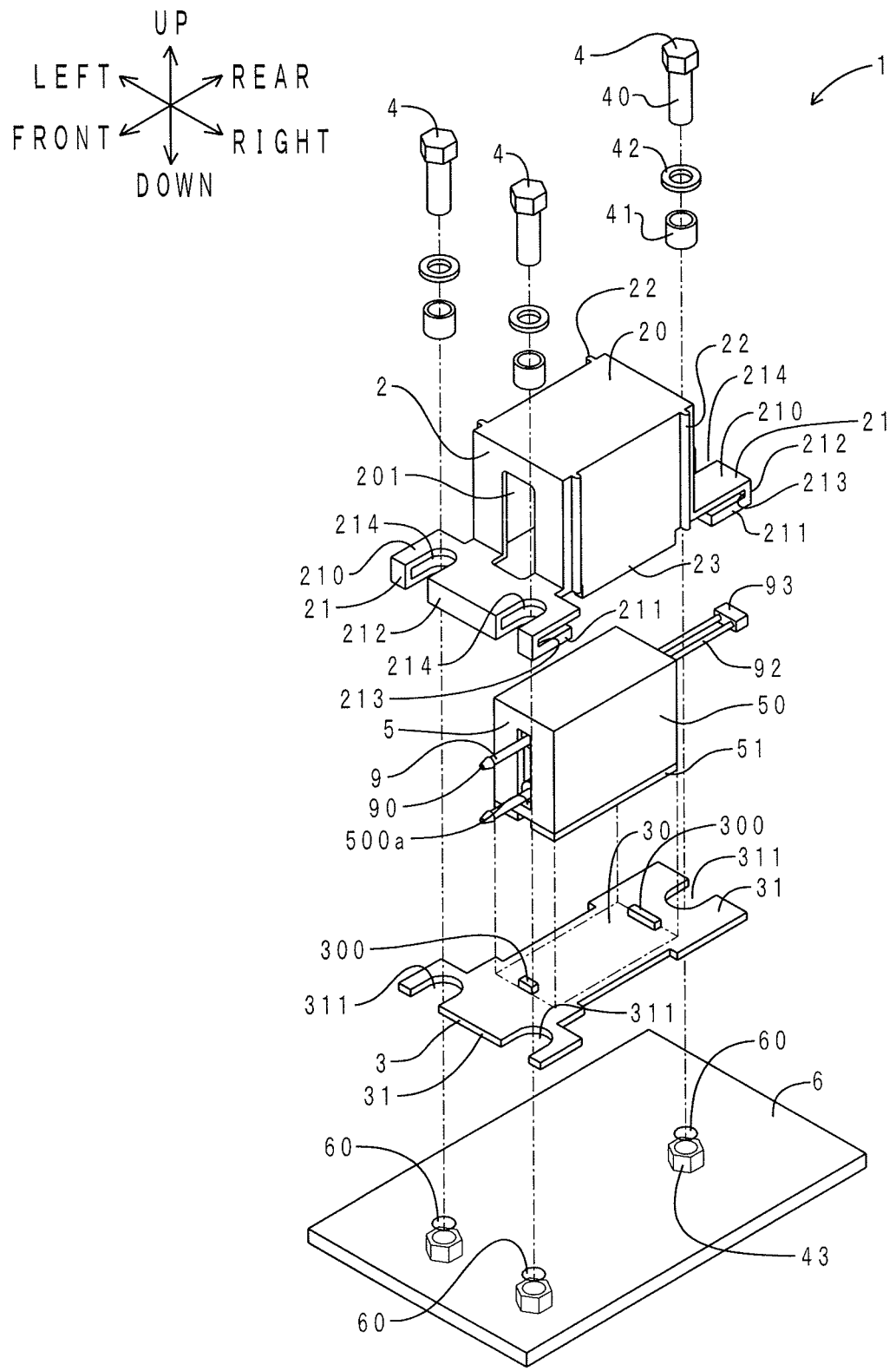
FIG. 6 is an exploded perspective view of a vibrating member attachment structure of a second embodiment.

FIG. 6 is an exploded perspective view of the vibrating member attachment structure of the present embodiment. Portions corresponding to those of FIG. 2 are denoted by the same reference characters. As shown in FIG. 6, U-shaped through grooves 214 are formed in the pair of front and rear folded-back portions 21. Each through groove 214 extends from the hem portion 210 to the contact portion 211 via the joint portion 212. The bolt 40 and the collar 41 are inserted through the through groove 214. The through groove 214 is in contact with the collar 41. The entire lower surface of each contact portion 211 is in surface contact with the upper surface of the bracket 6. That is, the contact portions 211 have no line contact portion.

Two shift suppressing walls 23 stand downward on the right and left sides of the accommodating portion 20 of the sound insulation layer 2. The shift suppressing walls 23 are included in the concept of the "shift suppressing portion" of the present invention. The sealing portion 30 of the support member 3 is placed between the pair of right and left shift suppressing walls 23. The pair of right and left shift suppressing walls 23 thus contact the right and left sides of the sealing portion 30, which restricts lateral movement of the sound insulation layer 2 with respect to the sound insulation layer 2.

U-shaped through grooves 311 are formed in the pair of front and rear insertion portions 31 of the support member 3. The bolt 40 and the collar 41 are inserted in each through groove 311. The through groove 311 is not in contact with the collar 41.

The vibrating member attachment structure 1 of the present embodiment has functions and effects similar to those of the vibrating member attachment structure of the first embodiment regarding the portions having the same configuration. As in the present embodiment, the sound insulation layer 2 and the support member 3 may have the through grooves 214, 311, the sound insulation layer 2 may have the shift suppressing walls 23, and the contact portions 211 may not have the line contact portion.

Others

The embodiments of the vibrating member attachment structure of the present invention are described above. However, embodiments are not particularly limited to the above embodiments. Various modifications and improvements can be made by those skilled in the art.

Figure 7A:
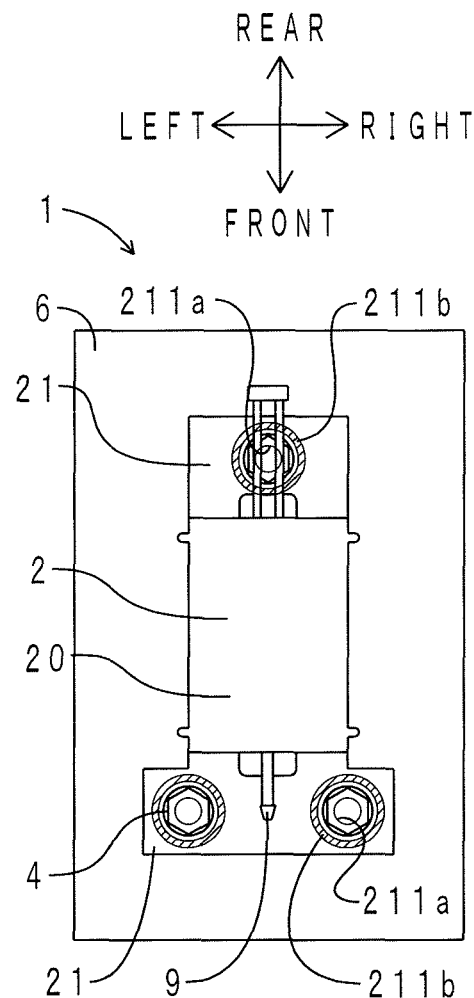
FIG. 7A is a top view of a vibrating member attachment structure of another embodiment.
Figure 7B:
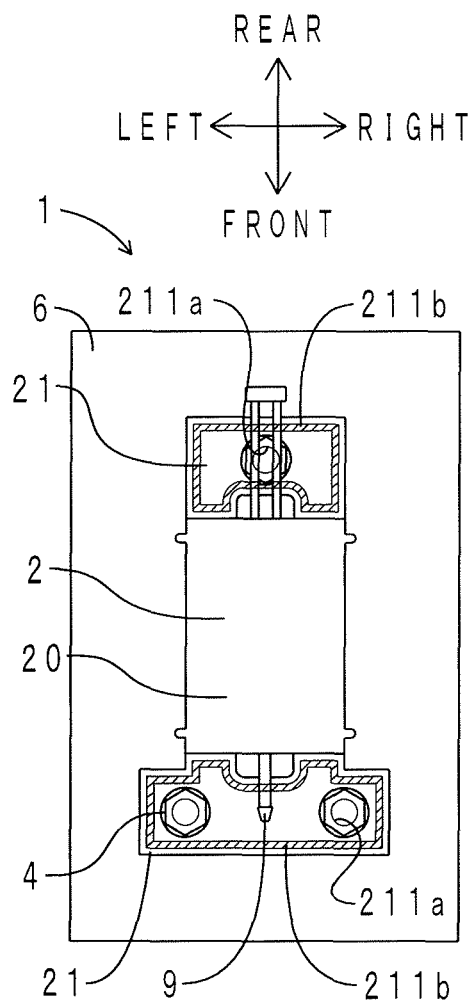
FIG. 7B is a top view of a vibrating member attachment structure of a further embodiment.
Figure 7C:
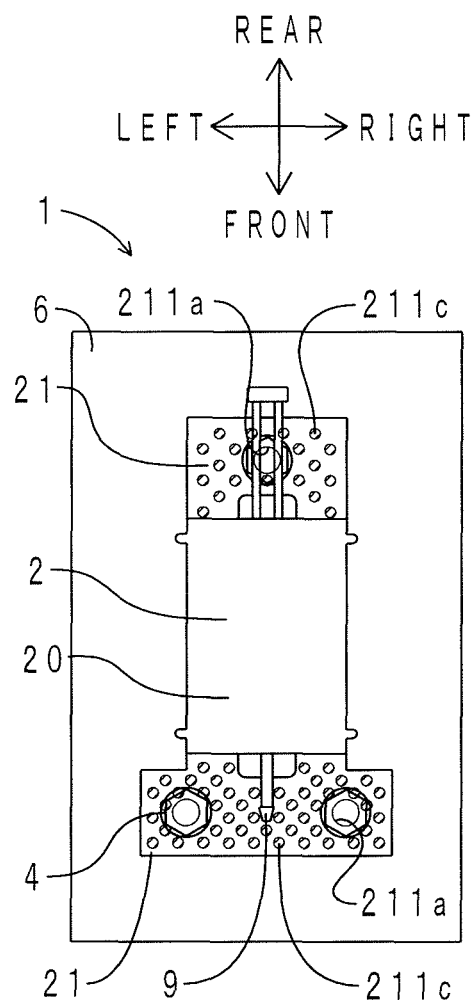
FIG. 7C is a top view of a vibrating member attachment structure of a still another embodiment.

The shape (the extending direction, the sectional shape) of the line contact portion 211b or the point contact portion provided on the contact portion 211, the number of line contact portions 211b and point contact portions, and the extending direction of the line contact portion 211b and the point contact portion are not particularly limited. FIG. 7A is a top view of a vibrating member attachment structure of another embodiment. FIG. 7B is a top view of a vibrating member attachment structure of a further embodiment. FIG. 7C is a top view of a vibrating member attachment structure of a still another embodiment. Portions corresponding to those of FIG. 5 are denoted by the same reference characters. Through holes, line contact portions, and point contact portions are shown transparently.

As shown in FIG. 7A, an annular line contact portion 211b (hatched portion) may be provided around the through hole 211a of the contact portion 211. As shown in FIG. 7B, a frame-shaped line contact portion 211b (hatched portion) may be provided along the outer edge of the contact portion 211. As shown in FIG. 7C, a plurality of conical point contact portions 211c (hatched portions) that are tapered downward may be provided. The line contact portions 211b and the point contact portions 211c are preferably uniformly distributed over the entire surface of the contact portion 211.

Figure 8:
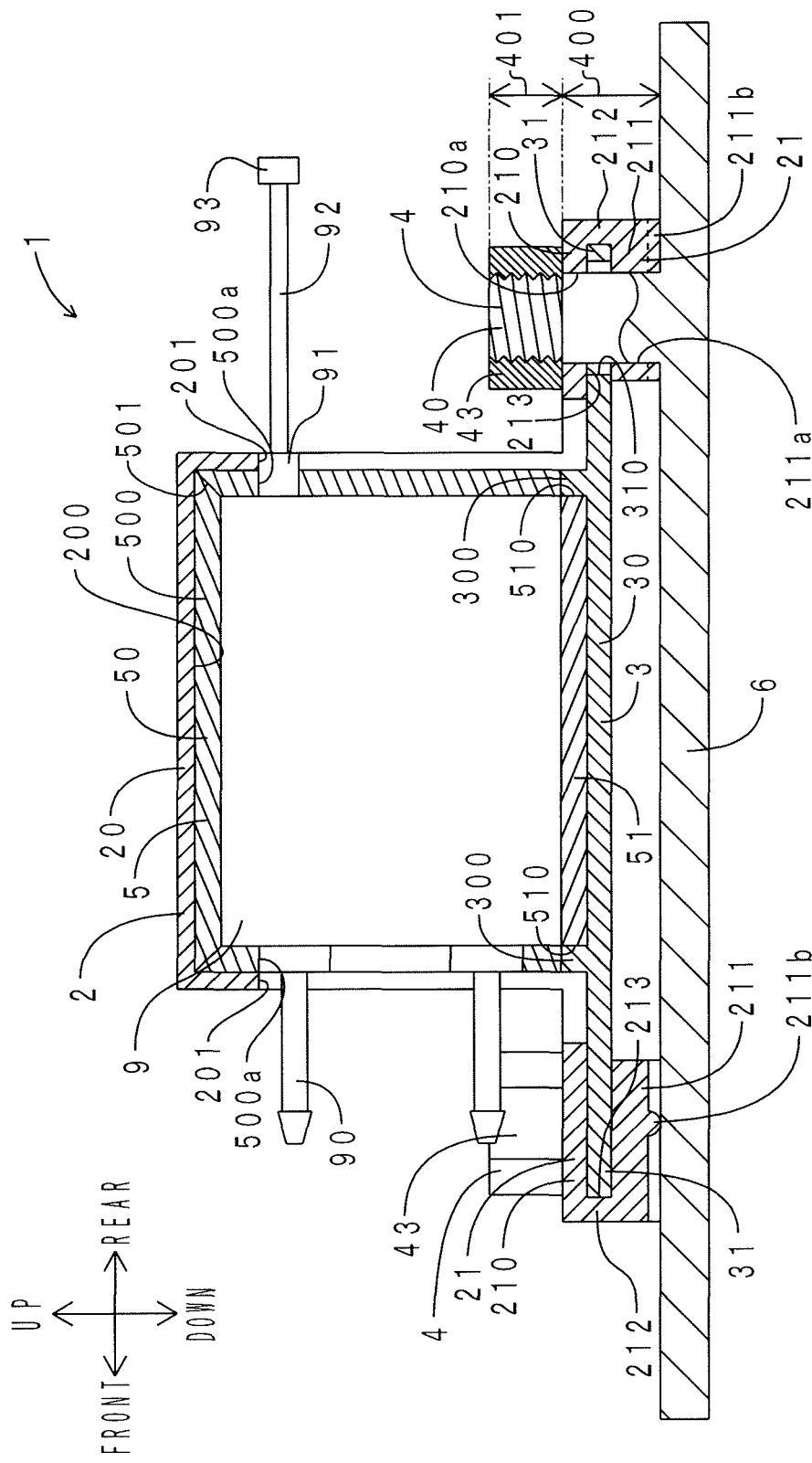
FIG. 8 is a longitudinal sectional view of a vibrating member attachment structure of a still further embodiment as viewed from the right.

The type of attachment members 4 is not particularly limited. FIG. 8 is a sectional view along the longitudinal direction of a vibrating member attachment structure of a still further embodiment as viewed from the right. Portions corresponding to those of FIG. 4 are denoted by the same reference characters. As shown in FIG. 8, the bolt 40 may protrude from the upper surface of the bracket 6. The bolt 40 includes a body 400 and a distal end 401. The body 400 is included in the concept of the "deformation suppressing portion" of the present invention. The body 400 does not have a threaded portion on its outer peripheral surface. The vertical length (axial length) of the body 400 is the same as that of the folded-back portion 21. The distal end 401 has a threaded portion on its outer peripheral surface. The nut 43 is tightened on the distal end 401. If the body 400 and the folded-back portion 21 are made to have the same length in the vertical direction like the present embodiment, deformation of the folded-back portion 21 by a tightening load of the nut 43 to the bolt 40 can be suppressed without using a collar.

The material of the sound absorption layer 5 is not particularly limited. If a foamed resin containing magnetic fillers is used as the sound absorption layer 5, the materials disclosed in Japanese Patent Application Publication No. 2009-235979 (JP 2009-235979 A) may be used by way of example.

Examples of the formed resin include polyethylene foam, polypropylene foam in addition to polyurethane foam. A so-called magnetic material may be used as the magnetic fillers. Preferred examples include ferromagnetic materials such as iron, nickel, cobalt, gadolinium, and stainless steel, antiferromagnetic materials such as MnO, $Cr_2O_3$, $FeCl_2$, and MnAs, and alloys using these materials. Especially, stainless steel, a copper-iron alloy, etc. are preferred because of their high thermal conductivity and high workability as fillers. Since the surface of stainless steel is covered by an oxide film, stainless steel has high rust-proof performance and high bonding strength with polyurethane foam. The copper-iron alloy is a eutectic alloy of copper and iron, and such a semi-hard magnetic copper-iron alloy as disclosed in Japanese Examined Patent Application Publication No. H03-064583 (JP H03-064583 B) is preferable. Separation between copper and iron is not caused in such a copper-iron alloy even if it is finely pulverized so as to be used as fillers. The copper-iron alloy therefore has two characteristics of both copper and iron, namely the high thermal conductivity of copper and the magnetic property of iron. Accordingly, the use of the copper-iron alloy improves heat transfer capability as compared to other magnetic materials even if the content is the same.

In the case of manufacturing the sound absorption layer 5 made of a foamed resin containing magnetic fillers, a foamed material may first be prepared by mixing a foamed resin material, magnetic fillers, etc. Next, a mold cavity may be filled with the foamed material, and foam molding may be performed while a magnetic field is applied to the cavity. This allows the magnetic fillers in the foamed material to be successively oriented in chains along the direction of the magnetic field in the cavity. Accordingly, making the direction of the magnetic field the same as the thickness direction of the sound absorption layer 5 can increase thermal conductivity in the thickness direction of the sound absorption layer 5.

The material of the sound insulation layer 2 is not particularly limited. TPO (polyolefin-based thermoplastic elastomer), TPS (styrene-based thermoplastic elastomer), TPU (polyurethane-based thermoplastic elastomer), etc. can be used in addition to TPV.

The materials of the support member 3 and the bracket 6 are not particularly limited. The support member 3 and the bracket 6 may be made of a resin (polyamide (PA)), polyethylene (PE), etc.) or a metal (iron, stainless steel, aluminum, etc.). The use of the support member 3 made of a material having high thermal conductivity (e.g., a metal) further improves heat dissipation capability of the electromagnetic valve 9. The type of vibrating member 9 is not particularly limited. The vibrating member 9 may be an actuator such as a servomotor, a solenoid, and an EGR valve.

The type of protruding portion is not particularly limited. The protruding portion may be a rotating shaft, a cylinder, a gear, etc. in addition to the ports 90, the connectors 91, 93, and the cords 92. The number of protruding portions is not particularly limited. For example, one port 90 or three or more ports 90 may be provided.

The invention claimed is:

1. A vibrating member attachment structure, comprising:
   a sound insulation layer made of an elastomer and including
      an accommodating portion that defines an accommodating space in which a vibrating member that vibrates is accommodated, and
      a folded-back portion having a hem portion connecting to the accommodating portion, a contact portion placed so as to face the hem portion and contacting a mating member, a joint portion connecting the hem portion and the contact portion, and an insertion space defined by the hem portion, the contact portion, and the joint portion;
   a support member having higher rigidity than the sound insulation layer and including
      a sealing portion that seals an opening of the accommodating space, and
      an insertion portion that connects to the sealing portion and that is inserted in the insertion space; and
   an attachment member being not in contact with the insertion portion and including
      a shaft portion that extends through the folded-back portion with the insertion portion being inserted in the insertion space to attach the folded-back portion to the mating member, and
      a deformation suppressing portion that suppresses elastic deformation of the folded-back portion due to an attachment load.

2. The vibrating member attachment structure according to claim 1, further comprising:
a sound absorption layer that is made of a foamed resin, that covers outside of the vibrating member, and that is accommodated in the accommodating space.

3. The vibrating member attachment structure according to claim 2, wherein
the sound absorption layer contains magnetic fillers.

4. The vibrating member attachment structure according to claim 1, wherein
the contact portion has at least one of a line contact portion that line-contacts the mating member, and a point contact portion that point-contacts the mating member.

5. The vibrating member attachment structure according to claim 1, wherein
the hem portion has a smaller thickness than the contact portion.

6. The vibrating member attachment structure according to claim 1, wherein
the accommodating portion has a window portion that allows the accommodating space to communicate with outside, and
the vibrating member has a protruding portion that protrudes to the outside from the accommodating space through the window portion.

7. The vibrating member attachment structure according to claim 6, wherein
the window portion extends to the hem portion.

8. The vibrating member attachment structure according to claim 1, wherein
the sound insulation layer has on its outer surface a buffer portion that reduces shock that is caused when the sound insulation layer contacts an adjoining member.

9. The vibrating member attachment structure according to claim 1, wherein
at least one of the sound insulation layer and the support member has a shift suppressing portion that suppresses relative shifting of the other.

* * * * *